United States Patent [19]

Grant

[11] 4,425,039

[45] Jan. 10, 1984

[54] APPARATUS FOR THE PRACTICE OF DOUBLE EXPOSURE INTERFEROMETRIC NON-DESTRUCTIVE TESTING

[75] Inventor: Ralph M. Grant, Rochester, Mich.

[73] Assignee: Industrial Holographics, Inc., Auburn Heights, Mich.

[21] Appl. No.: 375,851

[22] Filed: May 7, 1982

[51] Int. Cl.$^3$ ............................................. G01B 9/025
[52] U.S. Cl. ....................................... 356/35.5; 248/1; 356/244
[58] Field of Search ...................... 108/26, 161; 141/1, 141/65, 392; 215/1 R; 248/1, 363; 312/223; 356/347, 348, 35.5, 244; 73/856

[56] References Cited

U.S. PATENT DOCUMENTS

| | | | |
|---|---|---|---|
| 3,111,074 | 11/1963 | Kennard, Jr. et al. | 141/65 X |
| 3,816,649 | 6/1974 | Butters et al. | 358/93 |
| 3,998,347 | 12/1976 | Mahl | 220/82 R X |
| 4,234,256 | 11/1980 | Yeager | 356/348 |

FOREIGN PATENT DOCUMENTS 573492  6/1924  France .................................. 141/65

*Primary Examiner*—Stephen Marcus
*Assistant Examiner*—Mark Thronson
*Attorney, Agent, or Firm*—Krass, Young & Schivley

[57] ABSTRACT

A machine for performing double exposure, interferometric analysis of the changes in an object surface that result from changes in the ambient pressure on the object, as by holography, includes a pressure chamber partially formed by a horizontal base operative to support the test object and interferometric camera on its upper surface. A semispherical pressure dome is placed on the base over the test object and camera. A manifold volume bounded by a thin resilient steel disc supported beneath the base plate on a rubber gasket has its pressure equalized with the area beneath the dome by passages formed beneath the base plate. When the pressure is changed beneath the dome a similar pressure change occurs in the manifold volume beneath the base so that no net pressure forces are exerted on the base plate and no deformation of the camera or test object occurs.

8 Claims, 2 Drawing Figures

APPARATUS FOR THE PRACTICE OF DOUBLE EXPOSURE INTERFEROMETRIC NON-DESTRUCTIVE TESTING

DESCRIPTION

1. Field of the Invention

This invention relates to apparatus for subjecting a test object to two different ambient pressures so that an interferometric analysis may be performed of the deformation of the object surface resulting from the pressure change, and, more particularly, to such apparatus employing a pressure chamber designed so that no net forces are exerted on the support mechanism for the camera or test object as a result of the pressure change.

2. Background of the Invention

A common method of non-destructively testing an object involves the interferometric comparison of images of the object surface taken before the change in the ambient pressure on the object. The interferometric analysis may be performed using Holographic apparatus as disclosed in Principles of Holography, Smith, Wiley-Interocience N.Y., 1969 pg. 193-197, or an electric camera as disclosed in U.S. Pat. No. 3,816,649. In either event, the test object and the image recording apparatus are disposed within a pressure chamber and the object is illuminated with coherent light derived from a laser which is typically supported externally of the chamber and introduces its beam into the chamber through a train of optical elements. An image is first recorded of a coherently illuminated section of the surface of the object and then the pressure within the chamber is changed to impose stressing forces on the object. A second exposure of the same object surface is then made and is interferometrically compared with the first record to detect deformation of the object surface as a result of the pressure change.

Since this double exposure process actually detects changes in position between the camera and the surface of the object between the two exposures, it is critical that the camera and the object be supported in a highly stable manner. Any motion of the object relative to the image recording apparatus occuring between the time of the two exposures will mask or distort the measurement of the deformation of the object which is the central purpose of the analysis.

In order to minimize this undesirable motion, previous interferometric analysis systems of this type have mounted the pressure chambers above firm foundations, using vibration isolating mounts and have employed highly rigid base plates for supporting the object and the image forming apparatus.

In prior art machines, the pressure chamber has been formed by placing a semi-spherical dome over the rigid base plate that supports the object and the image forming apparatus. The dome has been supported by a crane or derrick so that it may be lifted away from the machine to allow insertion and removal of the test object and access to the camera or other image forming apparatus. The free edge of the dome has been formed with a resilient seal so that when the dome is lowered into contact with the base plate the volume bounded by the interior of the dome and the base plate has formed a sealed pressure chamber. A vacuum pump draws air out of this chamber to control the ambient pressure on the object.

One important cause of motion between the object and the camera in previous systems has been the deformation of the base plate as a result of the pressure change between the two double exposures used to form the interferogram. If the base plate area enclosed by the dome has a diameter of several feet, a relatively small change in the pressure within the sealed chamber will exert very substantial forces on the base plate causing it to deform. As the pressure in the chamber is reduced, the center of the base plate tends to move upwardly, toward the dome. In order to minimize this undesirable movement, prior art systems have formed the base plates in an extremely rigid manner, employing elaborate rib structures and bridge supports. These prior art design efforts have not only resulted in very expensive test machines but have only marginally solved the problem of deformation of the interference recording elements as a result of pressure changes within the chamber.

SUMMARY OF THE INVENTION

The present invention is accordingly directed toward a novel design for a pressure chamber useful in performing double exposure interferometric analysis which substantially eliminates movement of the interfering elements resulting from stresses imposed on the structure as a result of pressure changes within the chamber. Broadly, the pressure chamber of the present invention provides a base plate having a horizontal upper surface for supporting the test object and the image forming elements. A semi-spherical dome is supported for movement so that it may be positioned with its free edge in contact with the top of the base, or may be removed to allow access to the base. A manifold is formed on the underside of the base plate extending over at least a projection of that area on the top side of the base plate forming part of the pressure chamber. This manifold includes a bottom plate spaced from the base plate and parallel to it. The volume of the manifold is connected to the volume on the upper side of the base plate, preferably by apertures formed through the base plate, so that when the dome overlies the top of the base plate and a vacuum is drawn within the resulting pressure chamber, the pressure in the manifold, on the underside of the base plate, is also modified. In this manner the pressures on the upper and lower sides of the base plate are equalized and no net forces are induced on the base plate when the pressure within the chamber is changed. The bottom plate of the manifold will deform as a result of the pressure change but the connection between this bottom plate of the manifold and the base plate includes resilient elements which prevent this deformation from exerting any substantial forces on the base plate.

By virtue of this manifold construction, the base plate itself can be formed in a simpler less expensive manner than the base plates of the prior art and the present design accordingly results in lower cost and more effective pressure chamber system.

BRIEF DESCRIPTION OF THE DRAWINGS

Other objectives, advantages and applications of the present invention will be made apparent by the following detailed description of a preferred embodiment of the invention. The description makes reference to the accompanying drawings in which.

Figure 1:
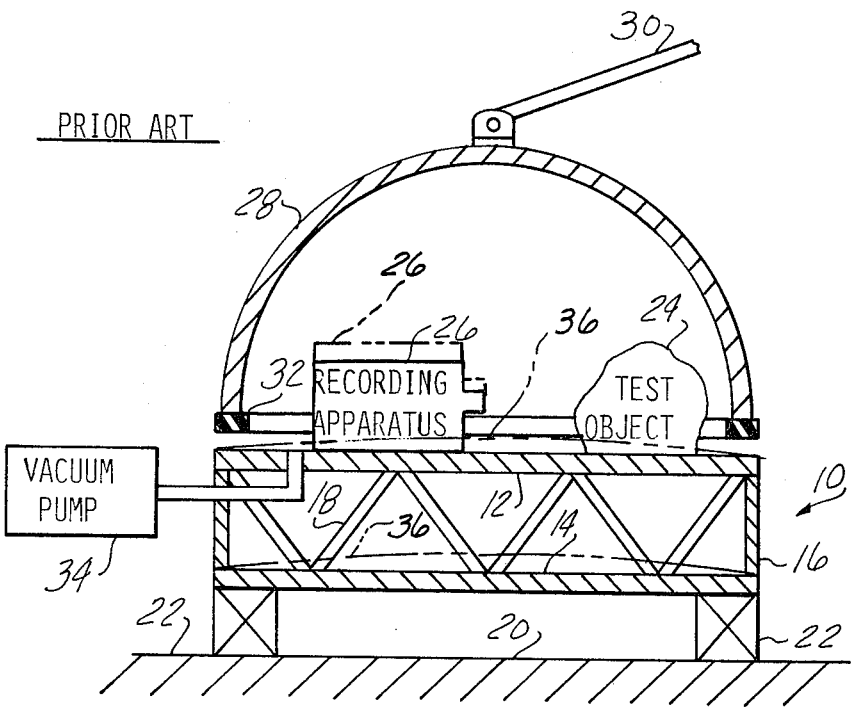
FIG. 1 is an elevational sectional view through an interferometric pressure chamber formed in accordance with the prior art.

Referring to the drawings, the broad arrangement of a pressure chamber for use in double exposure interferometric analysis, as formed in accordance with the prior art, is illustrated in FIG. 1. The chamber includes a base, generally indicated at 10. The base 10 may typically be formed out of steel and may consist of a disc-shaped upper plate 12, a disc-shaped lower plate 14, a vertical side plate 16 and interior ribs 18 extending between the top and bottom plates 12 and 14 to form a truss-like grid. Typically the elements will be welded to one another to form a highly rigid assembly.

The base 10 is typically supported above a rigid foundation 20, preferably of concrete or the like, by vibration isolation mounts 22.

The upper side of the base plate 10 acts as a support for a schematically illustrated test object 24 and schematically illustrated recording apparatus 26. In practice, the recording apparatus will include means for coherently illuminating the test object and photographic or electronic means for recording images.

A hemispherical dome 28, preferably formed of a strong, light-weight material such as fiber-reinforced plastic, is movably supported on the end of a crane arm 30. The dome 28 carries a resilient ring 32 on its free edge and the crane can position the dome with the resilient ring in contact with the upper surface of the base plate. It can also move the dome 28 out of position to allow access to the top of the base plate. When the dome 28 is positioned in contact with the base plate the volume enclosed by the dome and the base plate form an atmospherically sealed chamber and a vacuum pump 34 can control the pressure within the chamber. Typically, a relatively low vacuum is drawn, a first exposure of the object surface is made, and then the vacuum is increased and a second exposure of the object surface is made.

Since the base plate 10 forms one wall of the pressure chamber, forces will be exerted on the base plate, causing it to move upwardly toward the dome as the pressure within the chamber is reduced. The dotted lines 36 in FIG. 1 illustrate, in exaggerated form, the change in position of the surfaces of the upper plate 12 and lower plate 14 of the base as the pressure within the dome is reduced. This motion tends to distort the record of the interferometric analysis and the truss-like form of the base 10 is intended to provide it with a rigidity that will minimize this undesirable motion.

Figure 2:
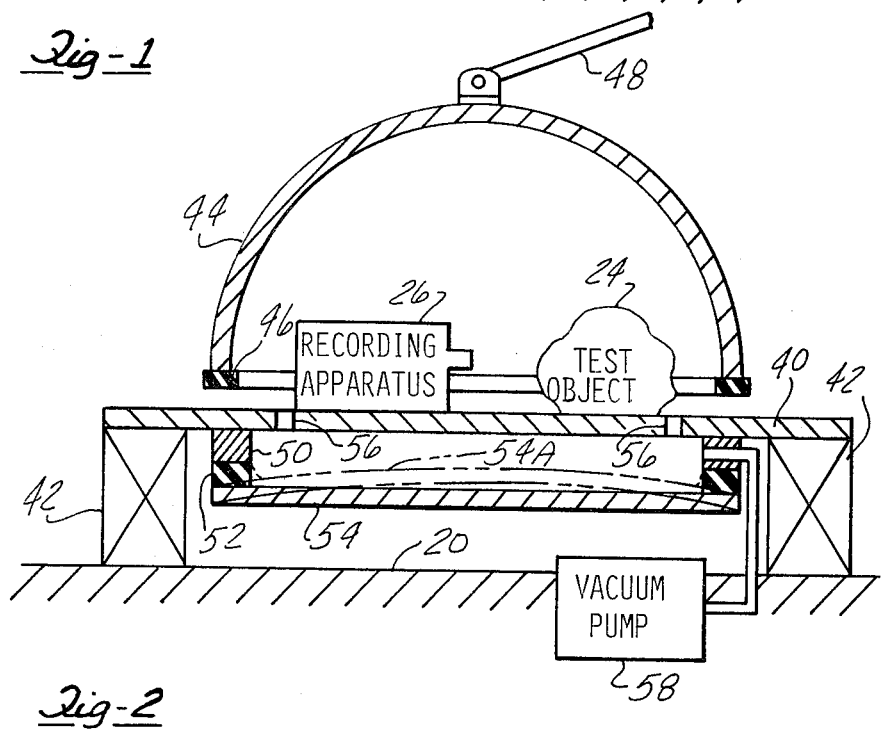
FIG. 2 is an elevational sectional view through an interferometric pressure chamber formed in accordance with the present invention.

A pressure chamber designed for use in double exposure interferometric analysis representing a preferred embodiment of the present invention is illustrated in FIG. 2. This chamber employs a horizontal steel base plate 40, usually disc-shaped in plan view. The plate 40 is supported above the rigid foundation 20 on vibration isolating mounts 42, of conventional design. The upper surface of the base plate 40 supports a schematically illustrated test object 24 and the recording and illuminating apparatus 26.

A dome 44 having a resilient ring 46 affixed to its free edge may be positioned on top of the base plate 40 by a crane arm 48.

A rigid steel ring 50, having a diameter at least equal to the diameter of the free end of the dome 44 is welded to the underside of the base plate 40 to encompass an area on the underside of the plate 40 that is a projection of the area encompassed by the dome on the upper side of the plate. The ring 50 has a resilient gasket 52 fixed to its underside. The gasket in turn supports a relatively flexible disc-shaped steel manifold flex plate 54. The plate 54 along with the rigid ring 50 and the gasket 52 define a manifold volume on the underside of the base plate 40. This volume is connected to the pressure chamber on the upper side of the base plate by apertures 56 formed through the base plate. In alternative embodiments of the invention other arrangements could be used to insure that the pressure in the manifold volume equals the pressure in the test chamber.

A vacuum pump 58 connects to the manifold volume and controls the vacuum within the manifold and the test vacuum chamber when the dome 44 is positioned in contact with the upper side of the base plate. When the dome is so positioned and a vacuum is drawn in the manifold area and the test chamber by the pumps 58, the decrease in pressure causes the manifold bottom plate 54 to flex to the position illustrated in phantom lines designated 54a; however, the pressure on the base plate is equal on both sides so no net forces are exerted on the base plate. Accordingly, no change in position is induced on the test object 24 or the recording apparatus 26 as a result of the changes in pressure within the test chamber. Since the base plate 40 forms a neutral axis with respect to the pressure changes, it is unaffected by the pressure change.

I claim:

1. A pressure chamber useful for performing double exposure interferometric analysis of a test object surface before and after a pressure change, comprising:
   a base plate having a horizontal extension and operative to support said test object and an apparatus for peforming the interferometric analysis;
   means operative to support the base plate relative to a rigid mounting surface;
   a pressure dome having a free edge configured so as to be supported in contact with the base plate to enclose an area above the base plate;
   means located beneath the base plate for defining an enclosed manifold volume substantially coextensive with the area of the base plate surrounded by the pressure dome;
   means for modifying the pressure within the volume defined by the base plate and the pressure dome; and
   means for maintaining pressure in the manifold volume in equilibrium with the pressure within the volume defined by the top of the base plate and the pressure dome, whereby the pressure on opposed sides of the base plate is maintained substantially equal, independent of changes in pressure within the pressure dome.

2. The pressure chamber of claim 1 wherein the pressure dome is supported for motion between a first position wherein its free edge is supported to enclose a volume on an upper surface of the base plate and a second position wherein its free edge is removed from the base plate to allow free insertion or removal of a test object on the upper surface of the base plate.

3. The pressure chamber of claim 2 including a resilient gasket operative to be disposed between the free edge of the pressure dome and the supporting section of the base plate to form a pressure resistant seal between the two.

4. The pressure chamber of claim 1 wherein said manifold volume is defined by a surface of the base plate, a thin sheet metal disc supported in spaced relation to the base plate, below the base plate, and a resilient annular gasket connecting the edge of the disc to the base plate so that the center of the disc may flex toward and away from the base plate in response to pressure variations within the manifold volume.

5. The pressure chamber of claim 4 including a rigid steel ring having a diameter substantially equal to the metal disc affixed beneath the base plate and supporting said resilient gasket.

6. The pressure chamber of claim 1 wherein said means for maintaining pressure equilibrium in the manifold volume and the volume defined by the pressure dome and the base includes apertures formed through the base plate so that the manifold volume and the volume beneath the pressure dome of the base plate are in communication with one another.

7. A pressure chamber useful for performing double exposure interferometric analysis of the surface of a test object before and after pressure changes, comprising:

a relatively rigid base plate having a substantially horizontal orientation;

means operative to support the base plate in a generally horizontal attitude above a rigid mounting surface;

a concave pressure cover having a free edge;

a resilient gasket formed about the free edge of the cover;

means for positioning the cover with the gasket in pressured contact with an upper surface of the base plate to define an enclosed volume between the cover and the base plate;

means for defining an enclosed manifold volume on the underside of the base plate, the manifold volume having a projection coextensive with the projection of the cover on the base plate;

passages through the base plate communicating the manifold volume with the volume within the cover; and means for modifying the pressure within the manifold volume and the volume within the cover, whereby no net pressure forces are exerted on the base plate as a result of pressure changes within the cover.

8. The pressure chamber of claim 7 in which said means operative to support the base plate in a generally horizontal attitude above a rigid mounting surface comprises a vibration isolating mount.

* * * * *